United States Patent [19]

Kube et al.

[11] 4,175,789

[45] Nov. 27, 1979

[54] SOLUTION MINING UTILIZING DISSOLVED OXYGEN WITH ELIMINATION OF ENTRAINED GAS

[75] Inventors: Wolfram H. Kube, Denver; David L. Shuck, Littleton, both of Colo.

[73] Assignee: Wyoming Mineral Corporation, Lakewood, Colo.

[21] Appl. No.: 900,038

[22] Filed: Apr. 25, 1978

[51] Int. Cl.$^2$ .............................................. E21B 43/28
[52] U.S. Cl. .......................................... 299/4; 423/18
[58] Field of Search ........................... 299/4, 5; 423/18

[56] References Cited

U.S. PATENT DOCUMENTS

| | | | |
|---|---|---|---|
| 2,563,623 | 8/1951 | Scott | 299/5 X |
| 3,273,972 | 9/1966 | Campbell et al. | 423/18 |
| 4,045,084 | 8/1977 | Hsueh et al. | 299/4 |
| 4,116,488 | 9/1978 | Hsueh et al. | 299/4 |

*Primary Examiner*—Ernest R. Purser
*Attorney, Agent, or Firm*—L. A. DePaul; Z. L. Dermer

[57] ABSTRACT

A method for leaching mineral values from an underground ore body in situ comprises introducing an oxygen-bearing gas into a pressurized saturation-disengagement chamber located above ground of the ore body where the oxygen-bearing gas becomes dissolved in a leach solution. The leach solution with dissolved oxygen therein is then pumped into the well and through the ore body where the leach solution oxidizes the mineral values in the ore body permitting their solubilization and transport by the leach solution to a recovery well where the pregnant leach solution is pumped above ground. The pregnant leach solution is then treated to remove the mineral values therefrom. Insuring that the oxygen-bearing gas is completely dissolved in the leach solution above ground in the saturation-disengagement chamber prevents gas bubbles from being pumped into the ore formation, thereby preventing loss of injectivity.

9 Claims, 1 Drawing Figure

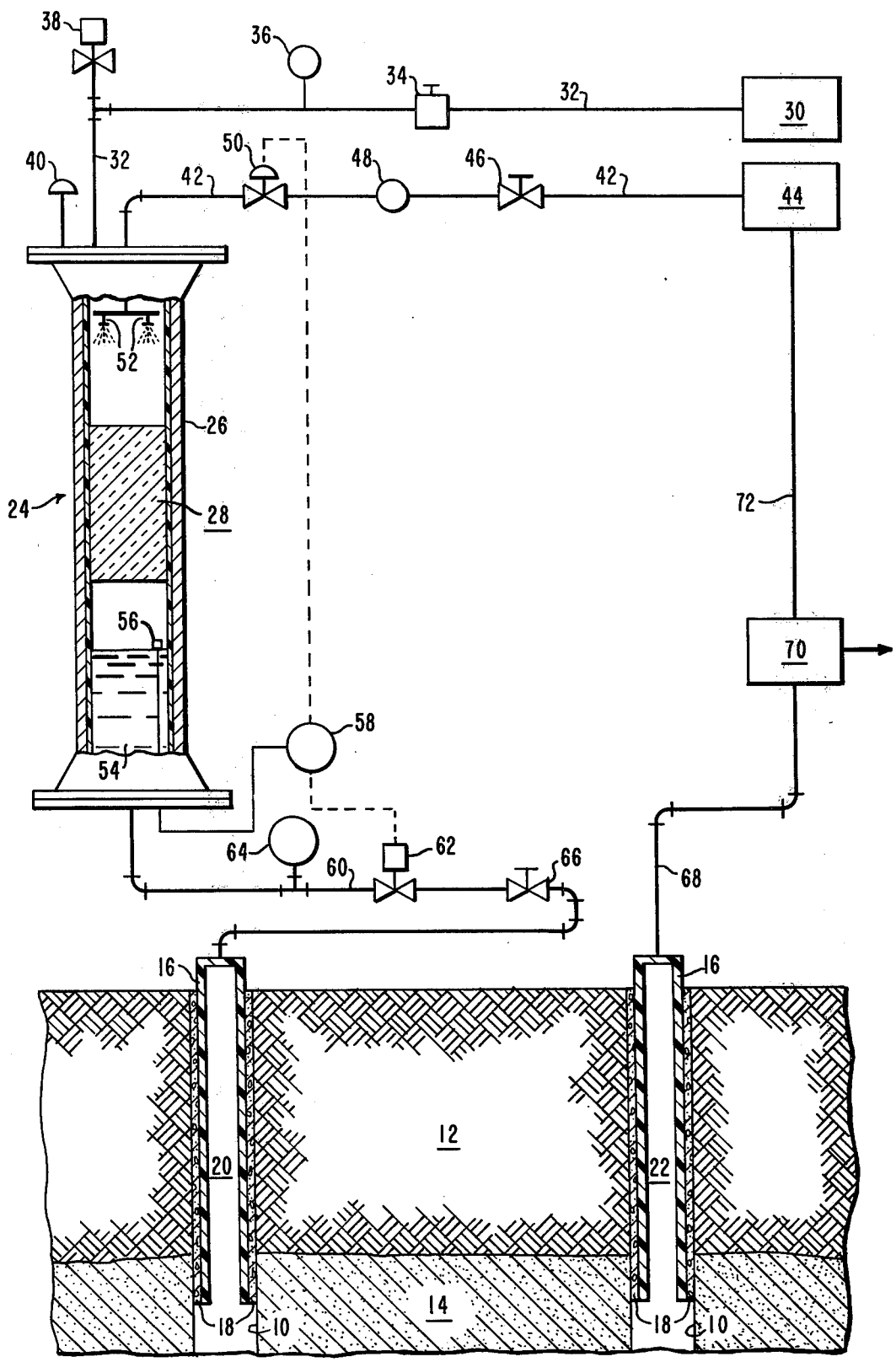

SOLUTION MINING UTILIZING DISSOLVED OXYGEN WITH ELIMINATION OF ENTRAINED GAS

BACKGROUND OF THE INVENTION

This invention relates to in situ solution mining methods, and particularly to in situ solution mining methods wherein an oxygen-bearing gas is dissolved in the leach solution above ground.

In the prior art methods for leaching uranium values from underground formations in situ, an oxygenated solution of a leaching agent is introduced into the uranium ore formation through a plurality of injection wells. The oxygenated leaching agent contacts the uranium in the ore body and oxidizes the uranium so that it may be solubilized by the leach solution. The oxidation of uranium is needed to convert the uranium values from a relatively insoluble +4 valance state, $UO_2$, to the more soluble +6 valance state, $UO_3$. Once the leach solution has thus oxidized the uranium and the uranium has become dissolved in the leach solution, the pregnant leach solution is pumped from the ground through a plurality of production wells, and the uranium values are then recovered by known procedures such as an ion exchange process. There are many known leaching agents that can be used in such a process, such as an acid leach or an alkaline leach agent. In addition, there are many known oxidizing agents that may be introduced into the leach solution to furnish the oxidizing capability. One such oxidizing agent is hydrogen peroxide; however, hydrogen peroxide is costly and difficult to handle, and its presence may diminish the permeability of the formation through secondary precipitation reactions.

In U.S. Pat. No. 3,860,289 to Learmont, issued Jan. 14, 1975 and entitled "Process For Leaching Mineral Values From Underground Formations In Situ", there is disclosed a process for leaching mineral values from an underground formation in situ wherein the process includes introduction of oxygen to the leaching solution at a substantial depth within the injection well where the head of solution thereabove increases the solubility of oxygen in the solution. While the Learmont process does provide one method of introducing an oxidizing agent into the leach solution, it does not provide a mechanism for assuring that the oxygen has become dissolved in the solution and that the oxygen is not present in a second gaseous phase. It is important that the oxygen not be present in the underground formation in a gaseous form because the presence of oxygen gas bubbles in the ore formation is believed to cause blocking of the formation and loss of solution injectivity (i.e. reduced solution flow at constant pressure). Of course, loss of injectivity decreases the recovery rate of the uranium values from the ore body.

In U.S. Pat. No. 3,708,206 to R. A. Hard et al, issued Jan. 2, 1973 and entitled "Process For Leaching Base Elements, Such As Uranium Ore, In Situ" there is described a process for leaching base elements, such as uranium values, from an underground water saturated ore deposit containing oxidizable materials such as sulfides wherein an oxygen-bearing gas is introduced into the ore deposit prior to or simultaneously with a leach solution to oxidize the base elements within the ore deposit to a soluble state where they can be dissolved in the leach solution. The patent to Hard et al. teaches that the oxygen-bearing gas should be dispersed in a multitude of small bubbles throughout the ore body and in a manner somewhat analogous to the effervescence associated with common seltzer water. It is now believed that such a process may not recover a significant portion of the uranium values in the ore body due to the fact that the contained bubbles tend to block the formation so that the leach solution does not penetrate into certain areas of the formation wherein uranium values are located.

What is needed is a method for oxygenating a leach solution for use in in situ solution mining wherein the leach solution is oxygenated above ground so that the dissolved oxygen content may be monitored and the presence of a second phase of oxygen can be eliminated.

SUMMARY OF THE INVENTION

A method for leaching mineral values from an underground ore body in situ comprises introducing an oxygen-bearing gas and a leach solution into a saturation-disengagement chamber located above ground of the ore body so that the oxygen-bearing gas becomes completely dissolved in the leach solution. The leach solution with dissolved oxygen therein and having no second phase oxygen gas is pumped through a well into the ore body where the leach solution contacts and oxidizes the mineral values in the ore body and causes the mineral values to become dissolved in the leach solution. The pregnant leach solution is then pumped through a production well and piped to apparatus for recovering the mineral values from the leach solution. The process provides a method whereby the amount of dissolved oxygen in the leach solution can be monitored above ground to thereby prevent a second phase of oxygen gas from being present in the leach solution in the ore formation, thus preventing clogging of the ore formation.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawing, wherein the single FIGURE of the drawing is a diagram of a well field and a saturation-disengagement chamber showing apparatus for dissolving oxygen in a leach solution.

DESCRIPTION OF THE PREFERRED EMBODIMENT

In in situ solution mining of uranium from underground formations, it is first necessary to oxidize the uranium in order to change the uranium from its natural state into a more soluble state. Once so oxidized, the uranium may be leached by common leaching agents with the pregnant leach solution being conducted above ground to be treated so that the uranium may be removed therefrom. The invention described herein provides a method for dissolving oxygen gas in a leach solution above ground so that the oxygen content of the leach solution may be measured and so that a second phase of oxygen gas may be eliminated from the leach solution as the leach solution is conducted through the underground ore body.

Referring to the figure, a conventional well bore hole 10 is drilled into the underground ore body so that the end of the bore hole 10 is near the ore zone 14. A casing tube 16 is positioned within bore hole 10 so that the lower end of the casing tube 16 is positioned in the horizontal zone of ore zone 14. Casing tube 16 is then cemented into bore hole 10 by cement 18 using conventional cementing techniques. This well can then be used as an injection well 20. Similarly, an additional well can be drilled and designated a recovery well 22. A saturation-disengagement chamber 24 which may be a packed column chosen from those well known in the art, such as the ones described in "Chemical Engineers+ Handbook" by John H. Perry and published by the McGraw-Hill Book Company, N.Y., is located above ground near injection well 20. Saturation-disengagement chamber 24 may comprise a 24" outside diameter steel pipe vessel 26 having a rubber or teflon inside lining to prevent oxidization of the steel vessel. Commercially available ½" ceramic saddle packing 28 is disposed over approximately the middle third of pressure vessel 26. Packing 28 serves to insure that the oxygen gas within the vessel becomes dissolved in the leach solution within the vessel. An oxygen supply 30 which may be a commercially available oxygen cylinder is connected to a first conduit 32 which is also connected at the other end to the saturation-disengagement chamber 24. Oxygen from oxygen supply 30 is introduced into first conduit 32 at approximately ambient temperature and at approximately 150 psi. A two-stage oxygen regulator 34 is disposed in first conduit 32 in order to reduce the pressure of the oxygen to approximately 80 psi. A pressure gauge 36 is disposed in first conduit 32 so that the two-stage oxygen regulator 34 is between the pressure gauge 36 and the oxygen supply 30. Pressure gauge 36 serves to determine the pressure in first conduit 32 as the oxygen enters the saturation-disengagement chamber 24. A pressure relief valve 38 is similarly disposed in first conduit 32 to provide a safety valve to release pressure from first conduit 32 should that pressure exceed acceptable limits. A rupture disc 40 is also disposed on saturation-disengagement chamber 24 so as to provide an additional pressure relief mechanism to prevent the pressure within saturation-disengagement chamber 24 from exceeding acceptable limits. A second conduit 42 is also attached to the top of saturation-disengagement chamber 24 for conducting a leach solution from a leach supply 44 to saturation-disengagement chamber 24. The leach solution may be chosen from those well known in the art such as an acid or carbonate leach solution. The leach solution may flow through second conduit 42 at a rate of approximately 10 to 20 gallons per minute and flow through a manual block valve 46 which is disposed in second conduit 42 for stopping the flow of the leach solution therein when it is necessary. A totalizing flow meter 48 is also disposed in second conduit 42 for measuring the flow of leach solution through second conduit 42. In addition, a flow control valve 50 is disposed in second conduit 42 for controlling the flow of leach solution therethrough. Second conduit 42 has several spray headers 52 attached thereto and disposed within the top portion of saturation-disengagement chamber 24 for spraying the leach solution into the oxygen atmosphere within saturation-disengagement chamber 24. The leach solution flows from leach supply 44 at a pressure of approximately 100 psi and a temperature of approximately between 5° C. and 15° C. The leach solution flows through second conduit 42 and through spray headers 52 into saturation-disengagement chamber 24. The pressure of the oxygen and leach solution within the top portion of the disengagement chamber 24 is maintained between 60 and 100 psi, preferably between 60 and 80 psi, while the temperature is between approximately 5° C. and 15° C. In order to insure that the oxygen remains dissolved in the leach solution in the ore zone 14, the pressure in saturation-disengagement chamber 24 may be maintained at less than the static pressure of the leach solution in bore hole 10. This will insure that the leach solution entering ore zone 14 will be less than saturated with oxygen thus increasing the probability that the oxygen will remain dissolved in the leach solution throughout ore zone 14. The oxygen and leach solution in the top portion of saturation-disengagement chamber 24 mix and proceed downwardly through saturation-disengagement chamber 24 across packing 28 where the oxygen becomes dissolved in the leach solution. The leach solution then drips off packing 28 and into a sump 54 which is formed by the bottom portion of disengagement chamber 24. Sump 54 serves to collect the leach solution having dissolved oxygen therein so that the leach solution may be pumped to the injection well 20. An oxygen atmosphere fills the portion of the saturation-disengagement chamber 24 that is located above the liquid level of sump 54. A liquid level monitor 56 is disposed in saturation-disengagement chamber 24 so as to be able to determine the level of liquid in sump 54. Liquid level monitor 56 is also connected to a level control mechanism 58 chosen from those level control mechanisms well known in the art such as a pressure differential or capacitance probe system. A third conduit 60 is attached to the bottom of saturation-disengagement chamber 24 and in fluid communication with the leach solution in sump 54 so as to be able to conduct the leach solution from sump 54 to casing tube 16 and into injection well 20. A low level shut-off valve 62 is disposed in third conduit 60 and electrically connected to liquid level control mechanism 58. Liquid level control mechanism 58 is capable of closing low level shut-off valve 62 if the level of leach solution in sump 54 falls below an acceptable limit as determined by liquid level monitor 56. The level of leach solution within sump 54 must be maintained above the entrance to third conduit 60 so that no oxygen gas is pumped into third conduit 60. It is important to prevent oxygen gas from being pumped into injection well 20 because the introduction of a second fluid phase of oxygen gas into the ore zone 14 is believed to cause clogging of the ore formation which results in decreased injectivity and limited penetration of the leach solution into the ore zone. To accomplish this objective it will generally be necessary to eliminate oxygen gas bubbles larger than about 50 to 100 microns in diameter from the leach solution. Sump 54 allows oxygen gas entrained by the leach solution to escape above the liquid level of sump 54 and prevents such oxygen gas from being introduced into third conduit 60. For this reason the sump depth is maintained at a level to allow a residence time for the oxygenated leach solutions of approximately 2.5 to 4.0 minutes to insure adequate time for any free oxygen to rise to the sump surface and escape therefrom. Liquid level control mechanism 58 is also electrically connected to flow control valve 50 and is capable of controlling flow control valve 50 so as to adjust the flow of leach solution through second conduit 42. It is also important that the level of leach solution within sump 54 be maintained below the lower extremity of packing 28 within saturation-disengagement chamber 24. In addition, a dissolved oxygen meter 64, chosen from those well known in the art such as one manufactured by IBC of Long Beach, California, is disposed in third conduit 60. Dissolved oxygen meter 64 is capable of measuring the amount of dissolved oxygen in the leach solution as the leach solution is conducted through third conduit 60. When the flow of leach solution through third conduit 60 is between 10 and 20 gallons per minute, the concentration of dissolved oxygen therein is generally on the order of 250 parts per million. A concentration of 250 parts per million of dissolved oxygen in the leach solution provides a high degree of oxidation of the uranium in the ore formation without the accompanying side effects of oxygen gas bubbles blocking the ore formation itself. A second block valve 66 is also located in third conduit 60 to enable complete isolation of the above ground system from the below ground system. A fourth conduit 68 is attached to casing tube 16 of recovery well 22 and is connected at its other end to the uranium recovery system 70. Fourth conduit 68 serves to conduct the pregnant leach solution from recovery well 22 to uranium recovery system 70. Uranium recovery system 70 may be chosen from those well known in the art and serves to extract the uranium values from the pregnant leach solution. Uranium recovery system 70 is also connected to leach supply 44 by means of fifth conduit 72 so as to permit recirculation of the leach agent.

IN OPERATION

The injection well 20 and recovery well 22 are prepared in conventional manner. Third conduit 60 is connected to injection well 20 and fourth conduit 68 is connected to uranium recovery system 70. Oxygen supply 30 is activated so that oxygen gas is conducted through first conduit 32 at a pressure of approximately 150 pounds per square inch or less and at a flow rate of between 25 and about 40 grams per minute. The oxygen in first conduit 32 flows through the two-stage oxygen regulator 34 and into disengagement chamber 24 where the oxygen fills the upper portion of the saturation-disengagement chamber 24. At the same time, leach supply 44 is activated such that leach solution is conducted through second conduit 42 and through spray headers 52 into the oxygen atmosphere of the upper portion of saturation-disengagement chamber 24. The oxygen and leach solution contact each other and packing 28 such that the oxygen becomes dissolved in the leach solution. The liquid leach solution then drops off packing 28 and into sump 54 while the undissolved oxygen gas remains above the liquid level of sump 54. Sump 54 is of a sufficient volume such that any undissolved oxygen gas present therein can bubble through the leach solution in sump 54 and back into the oxygen atmosphere of the upper portion of disengagement chamber 54. The leach solution is then pumped from sump 54 through third conduit 60 where dissolved oxygen meter 64 determines the amount of dissolved oxygen in the leach solution. If the amount of dissolved oxygen in the leach solution is of a sufficient magnitude, the leach solution is then pumped through second block valve 66 and into injection well 20. From injection well 20 the leach solution is forced through ore zone 14 and into contact with the uranium bearing ore deposit. The oxygen in the leach solution contacts the naturally occurring uranium and oxidizes the uranium into a soluble form, as is well understood in the art. In the more soluble form, the uranium becomes dissolved in the leach solution while the leach solution continues through ore zone 14 into recovery well 22. Since the oxygen has been dissolved in the leach solution, there is essentially no oxygen gas present as a separate phase within the ore zone 14. The absence of the second phase of oxygen gas in the ore zone 14 insures that the ore zone 14 does not become plugged by any oxygen in a gaseous phase, which thereby provides for better penetration of the leach solution into the ore zone formation. Better penetration of the leach solution into the ore zone provides for more extensive contact of the leach solution with the uranium present therein. The leach solution is then pumped from the recovery well 22 through fourth conduit 68 and into the uranium recovery system 70. In the uranium recovery system, the pregnant leach solution is processed to separate the uranium from the leach solution and the leach solution is recycled to leach supply 44. Therefore, the invention provides a method for leaching uranium from an underground ore body wherein oxygen may be dissolved in the leach solution above ground so that the dissolved oxygen content of the leach solution may be positively determined before the leach solution is introduced into the below ground ore formation, which thus increases the contact of the leach solution with uranium in the ore formation.

We claim as our invention:

1. A method for leaching mineral values from an underground ore body, in situ, comprising:
    drilling at least one well into said ore body;
    casing and sealing said well;
    contacting an oxygen-bearing gas with a leach solution above ground and causing oxygen to become dissolved in said leach solution while eliminating entrained oxygen-bearing gas from said leach solution prior to injection into said well;
    introducing said leach solution through said well and into said ore body where said leach solution contacts and oxidizes said mineral values with said mineral values becoming dissolved in said leach solution;
    recovering said leach solution with said mineral values dissolved therein; and
    treating said leach solution to extract said mineral values therefrom.

2. The method according to claim 1 wherein said step of contacting said oxygen-bearing gas with said leach solution comprises:
    introducing said oxygen-bearing gas into a saturation-disengagement chamber located above ground of said ore body;
    introducing said leach solution into said saturation-disengagement chamber along with said oxygen-bearing gas whereby said oxygen-bearing gas becomes dissolved in said leach solution; and
    pumping said leach solution from a sump within said saturation-disengagement chamber through said well and into said ore body where said leach solution contacts and oxidizes said mineral values with said mineral values becoming dissolved in said leach solution.

3. The method according to claim 2 wherein said step of introducing a leach solution into said saturation-disengagement chamber comprises spraying said leach solution into a packed column whereby said oxygen-bearing gas becomes dissolved in said leach solution.

4. The method according to claim 3 wherein said step of introducing an oxygen bearing gas comprises introducing a relatively pure form of oxygen gas.

5. The method according to claim 4 wherein said step of introducing a relatively pure form of oxygen gas comprises introducing said oxygen gas at a pressure between about 60 psi and about 100 psi and at a temperature between about 5° C. and 15° C.

6. The method according to claim 5 wherein said step of pumping said leach solution comprises pumping a leach solution having approximately 250 ppm of dissolved oxygen.

7. The method according to claim 6 wherein said leach solution is selected from a group consisting of ammonium bicarbonate, calcium bicarbonate, sodium bicarbonate, sodium carbonate, and sulfuric acid.

8. The method according to claim 7 wherein said mineral value is uranium.

9. The method according to claim 8 wherein said method further comprises introducing an additional oxidant along with said oxygen-bearing gas for increasing oxidant concentrations in said leach solution.

* * * * *